Figures 1, 2:
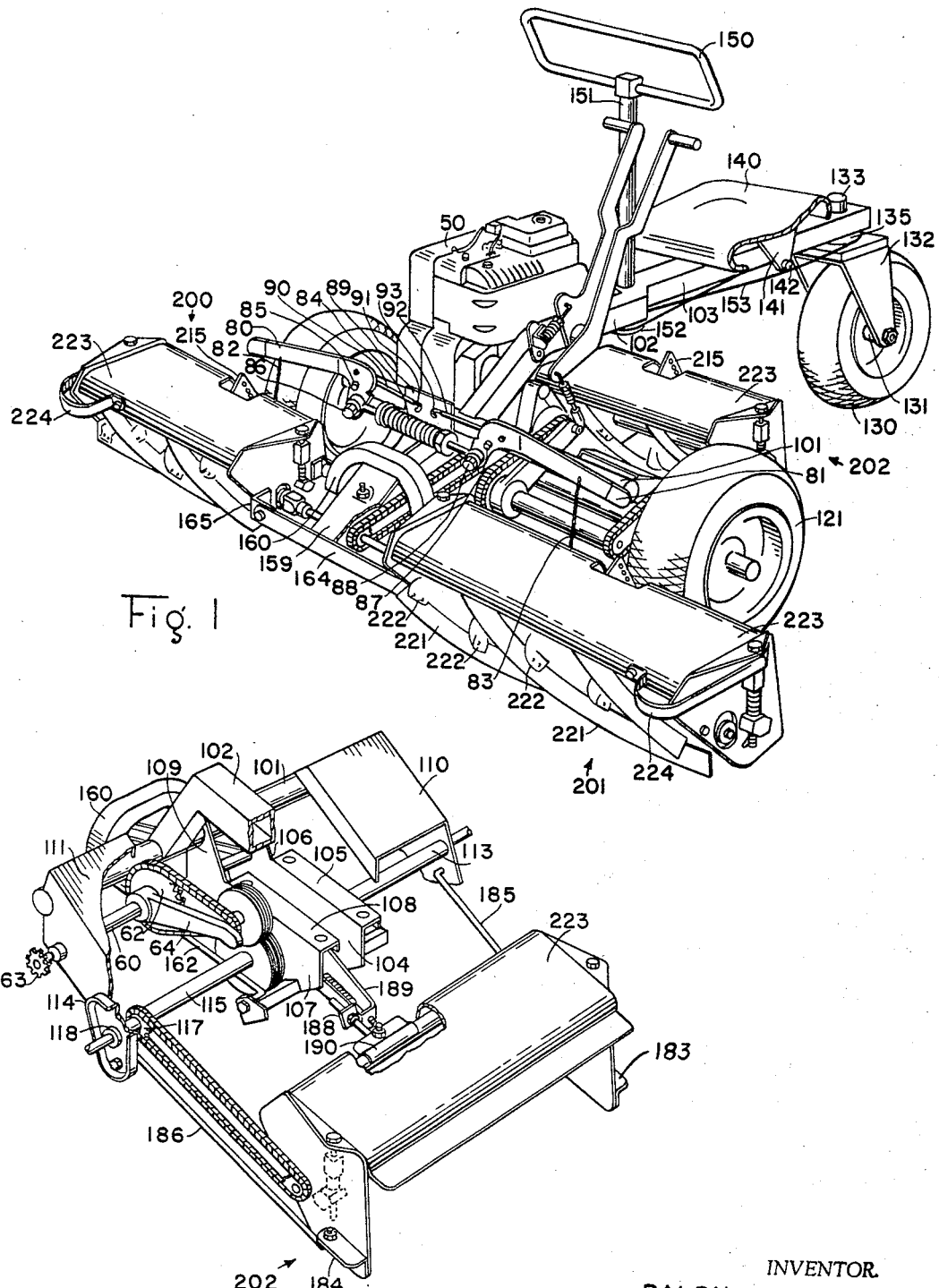

Nov. 12, 1968     R. W. SPEISER     3,410,063
MOWING APPARATUS

Filed Aug. 19, 1964     10 Sheets-Sheet 1

INVENTOR.
RALPH W. SPEISER
BY

Nov. 12, 1968  R. W. SPEISER  3,410,063
MOWING APPARATUS

Filed Aug. 19, 1964  10 Sheets-Sheet 2

INVENTOR.
RALPH W. SPEISER
BY

INVENTOR.
RALPH W. SPEISER
BY

Nov. 12, 1968    R. W. SPEISER    3,410,063
MOWING APPARATUS

Filed Aug. 19, 1964    10 Sheets-Sheet 4

INVENTOR.
RALPH W. SPEISER
BY

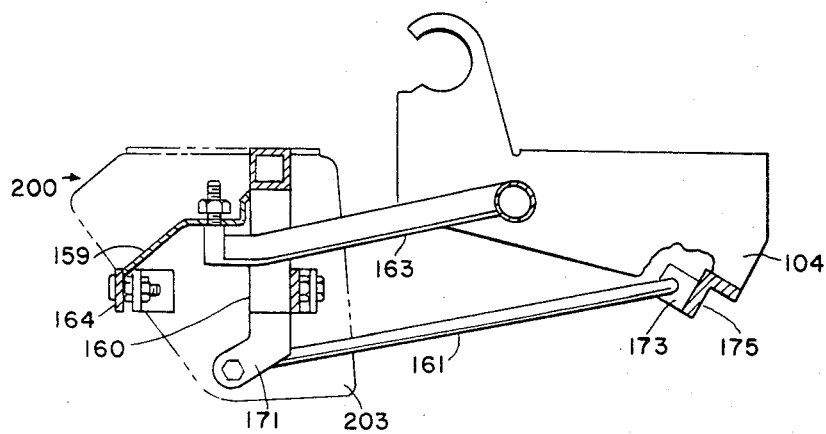
Fig. 12
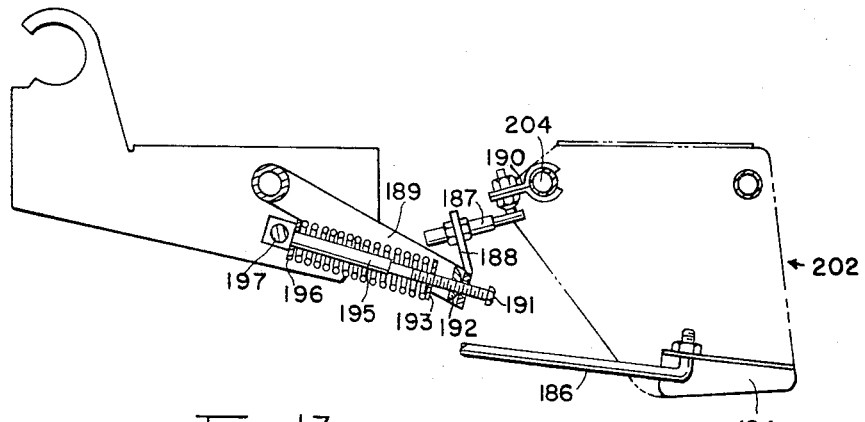
Fig. 13
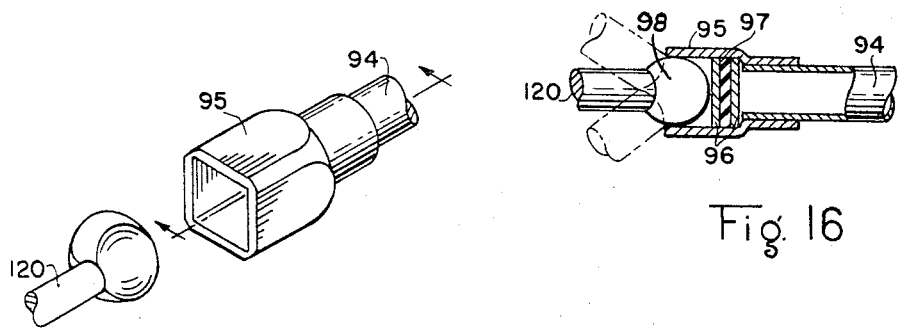
Fig. 15
Fig. 16
INVENTOR.
RALPH W. SPEISER
BY Vernon A. Johnson Nov. 12, 1968  R. W. SPEISER  3,410,063
MOWING APPARATUS Filed Aug. 19, 1964  10 Sheets-Sheet 6

INVENTOR.
RALPH W. SPEISER
BY *Vernon A. Johnson*

Nov. 12, 1968  R. W. SPEISER  3,410,063
MOWING APPARATUS

Filed Aug. 19, 1964  10 Sheets-Sheet 8

INVENTOR.
RALPH W. SPEISER
BY [signature]

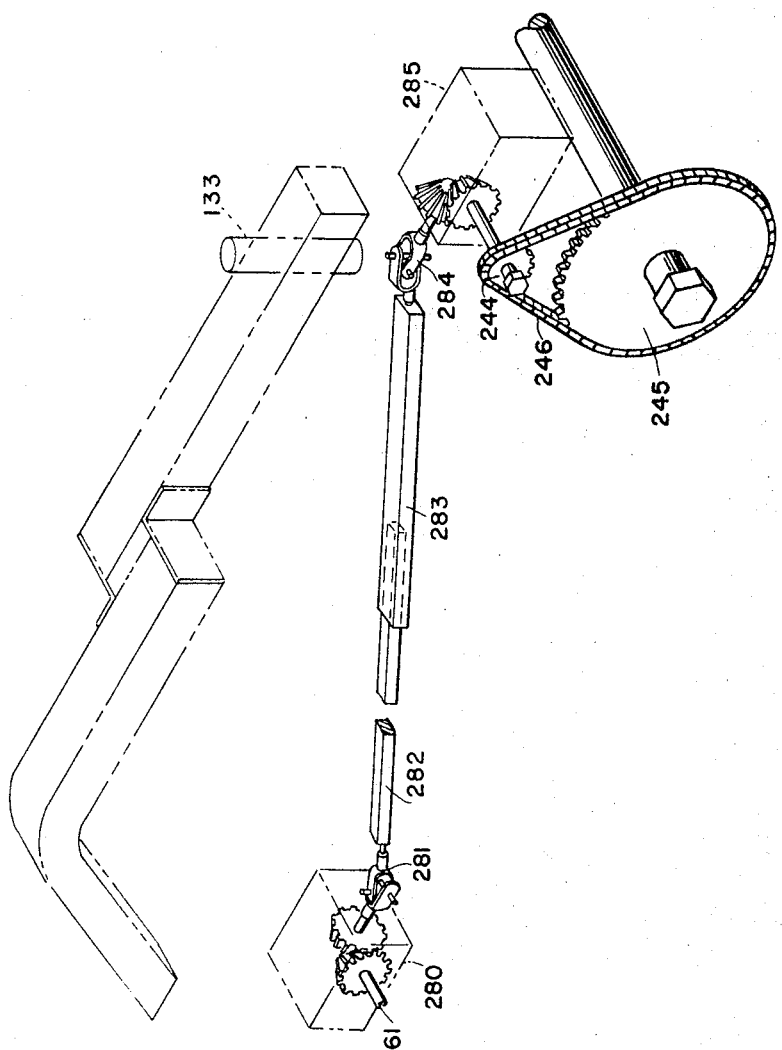

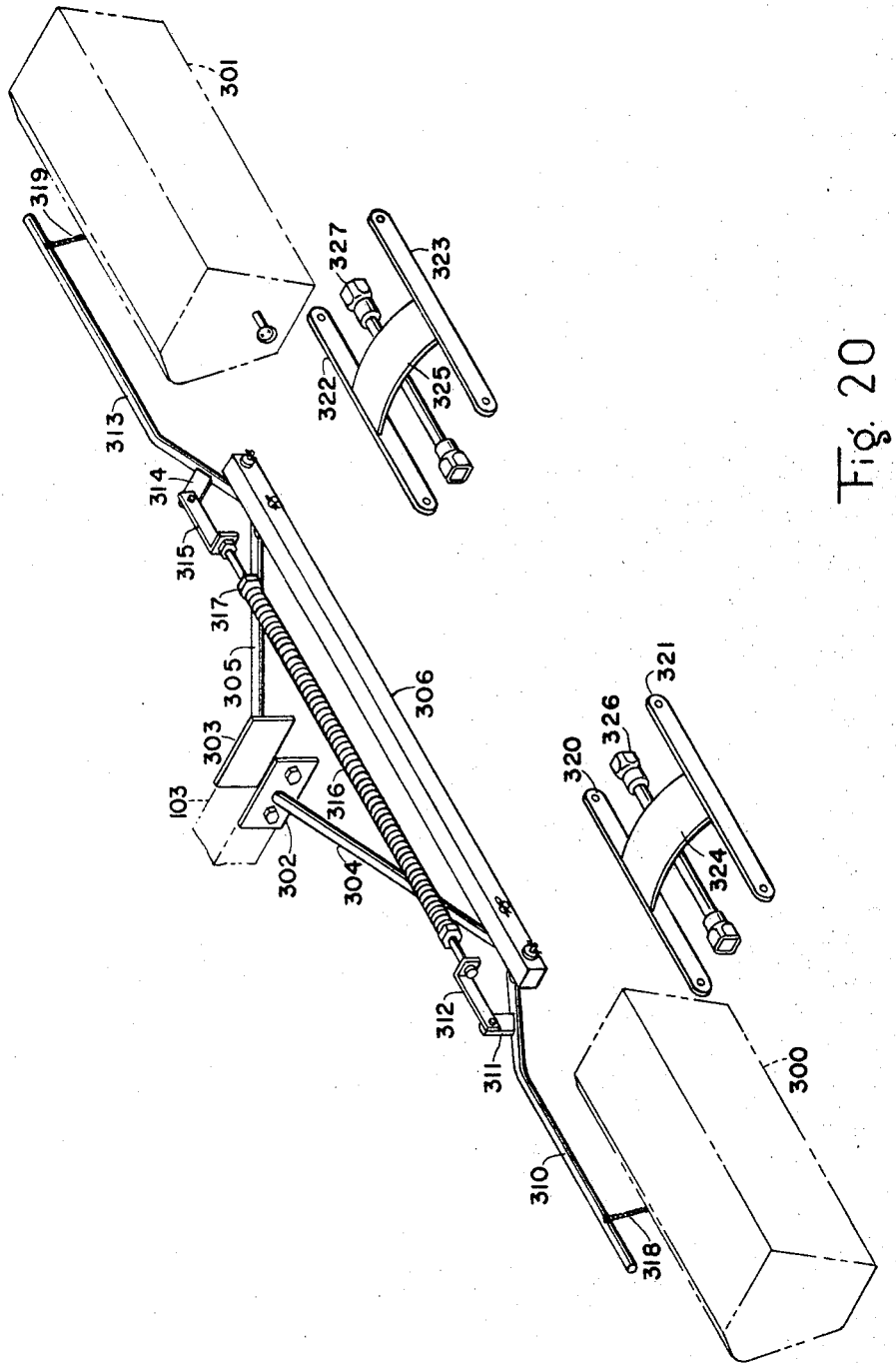

United States Patent Office 3,410,063
Patented Nov. 12, 1968

3,410,063
MOWING APPARATUS
Ralph W. Speiser, Minneapolis, Minn., assignor to Toro Manufacturing Corporation, Minneapolis, Minn., a corporation of Minnesota
Filed Aug. 19, 1964, Ser. No. 390,704
21 Claims. (Cl. 56—7)

This invention relates to an improved multiple mowing unit traction mowing machine, and more particularly, to a machine in which the mowing units are grouped in overlapping relationship about a small and compact traction vehicle, and in which the mowing elements of each unit are operated from the power source on the traction vehicle.

Riding lawn mowers suitable for institution, commercial, or park use, or for use on estates and the like where large expanses of grass are to be cut, are commonly in widespread use. In recent years, it has become popular to do this work with a machine that includes a plurality of rotary mowers mounted in overlapping relation, but the rotary mower has been found to have serious limitations for this work since the blades tend to "scalp" the turf, and especially when an effort is made to set the height of cut below two inches. Thus, the rotary mower has been found to be unsatisfactory for those users that wish to more carefully maintain their lawn areas, and a plurality of tractor mounted reel mowers mounted in overlapping relation continues to provide a better answer for such uses.

One of the serious limitations of the conventional reel mower is its cost, and this problem is understandably compounded when several reel mower units are carried by a single riding vehicle in slightly overlapping relation in an effort to provide wide-swath mowing. Thus, although machines constructed in accordance with the teachings of my United States Patent No. 2,229,859 have been sold in substantial quantities, the machine is quite expensive and this factor is felt to create a substantial hindrance to the overall commercial success of the machine.

Thus, it is the principal object of my invention to provide a riding vehicle and mower assembly, wherein several reel mowers are mounted in slightly overlapping relation to provide a wide-swath mowing configuration, and wherein the overall cost of such a machine is low as compared with comparable machines now on the market.

Figure 3:
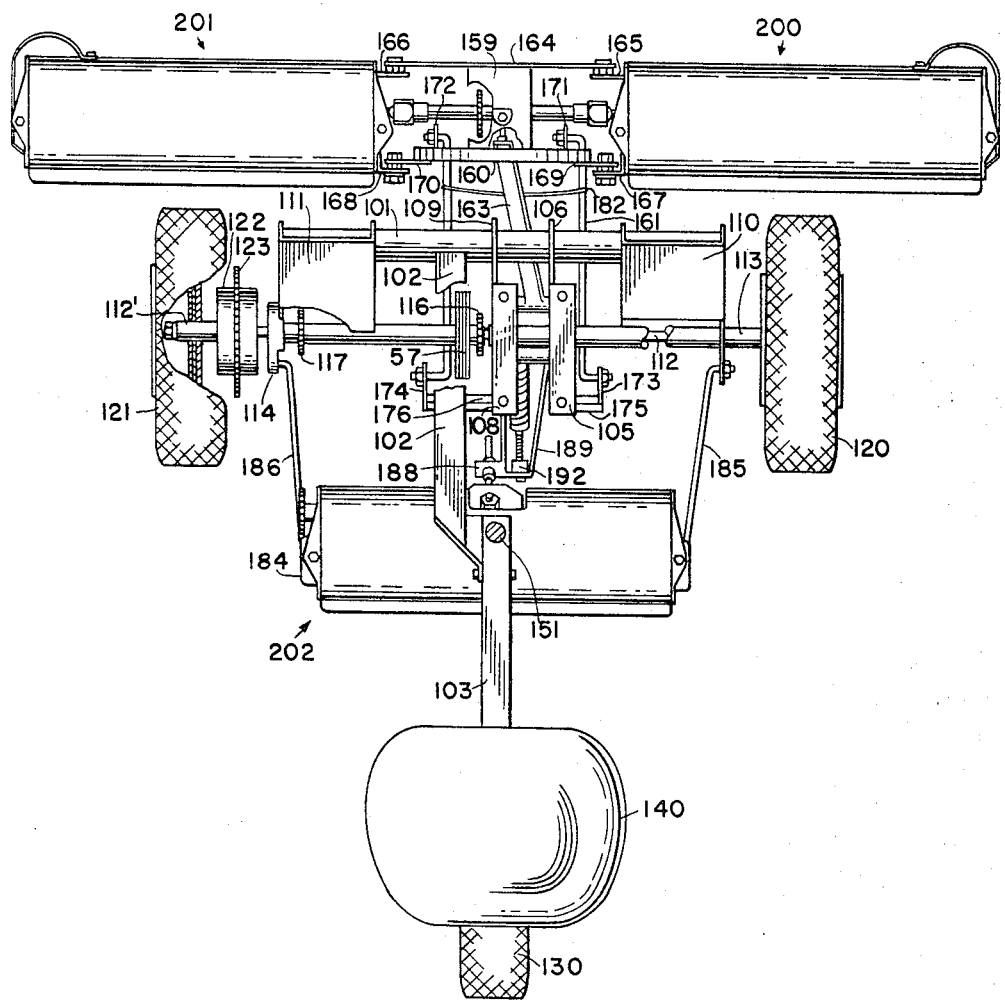
Figure 4:
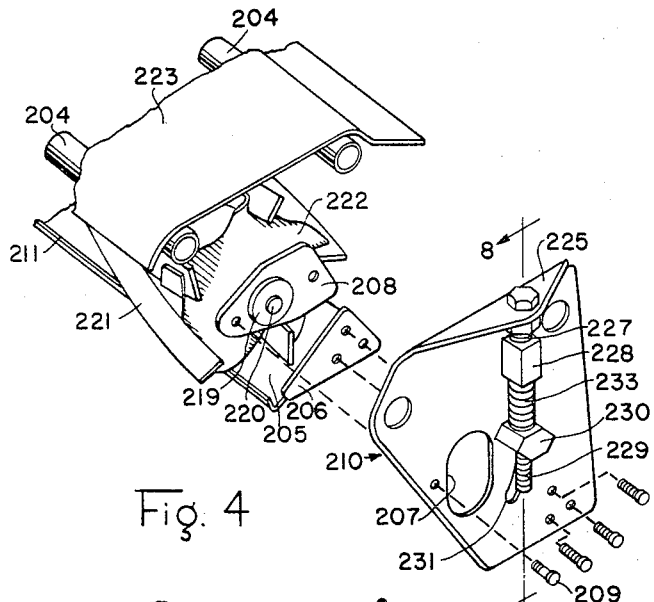
Figure 6:
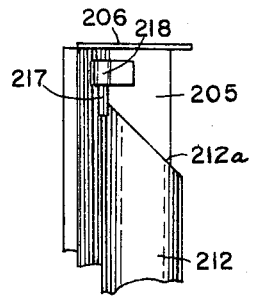
Figure 7:
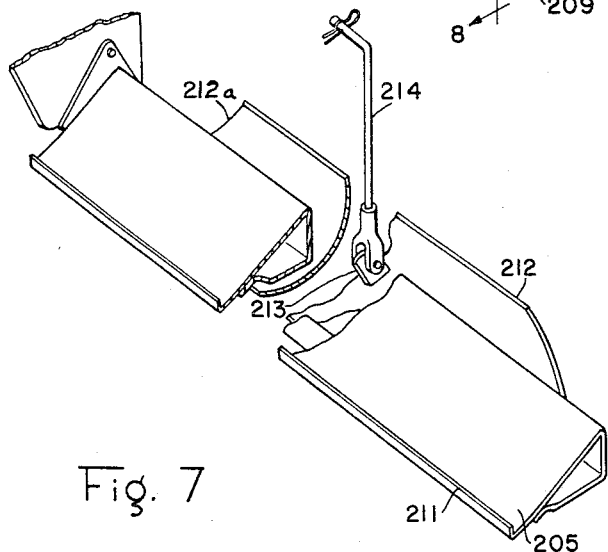
Figure 8:
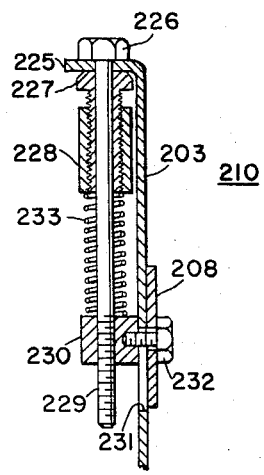
Figure 5:
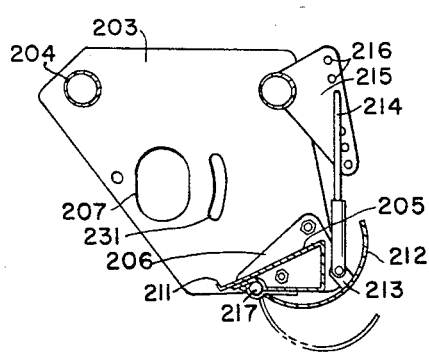
Figure 11:
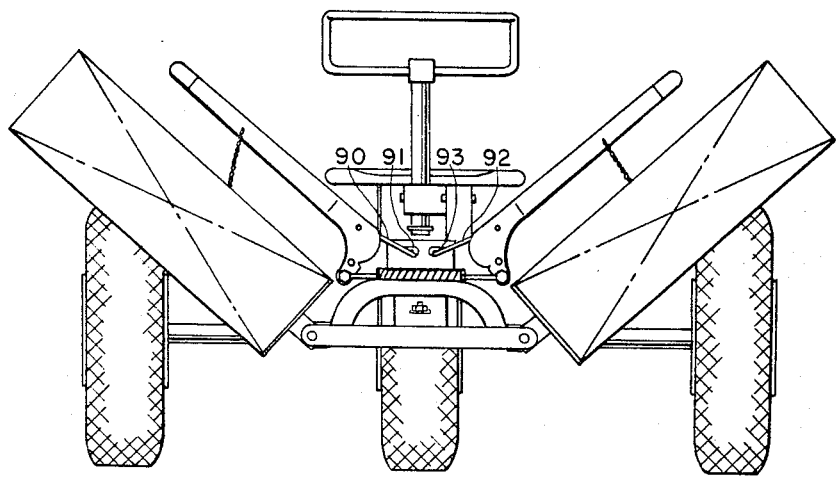
Figure 9:
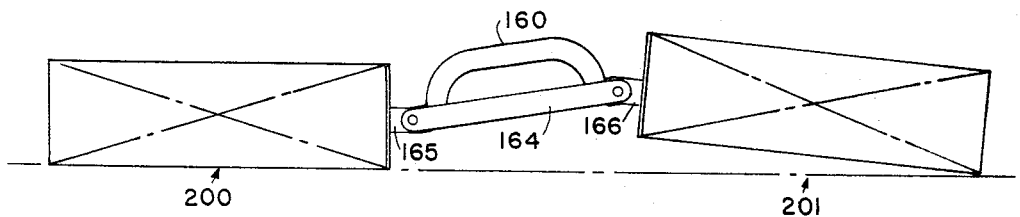
Figure 10:
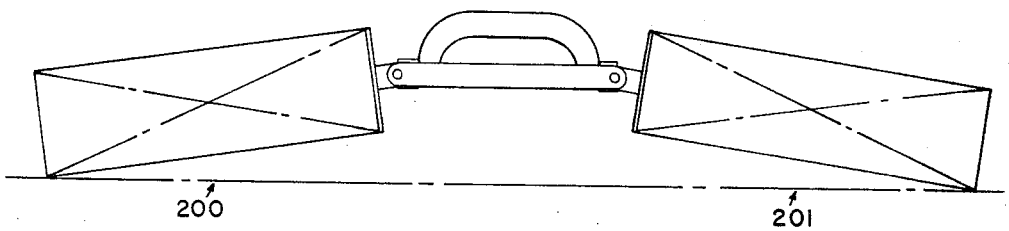
Figure 14:
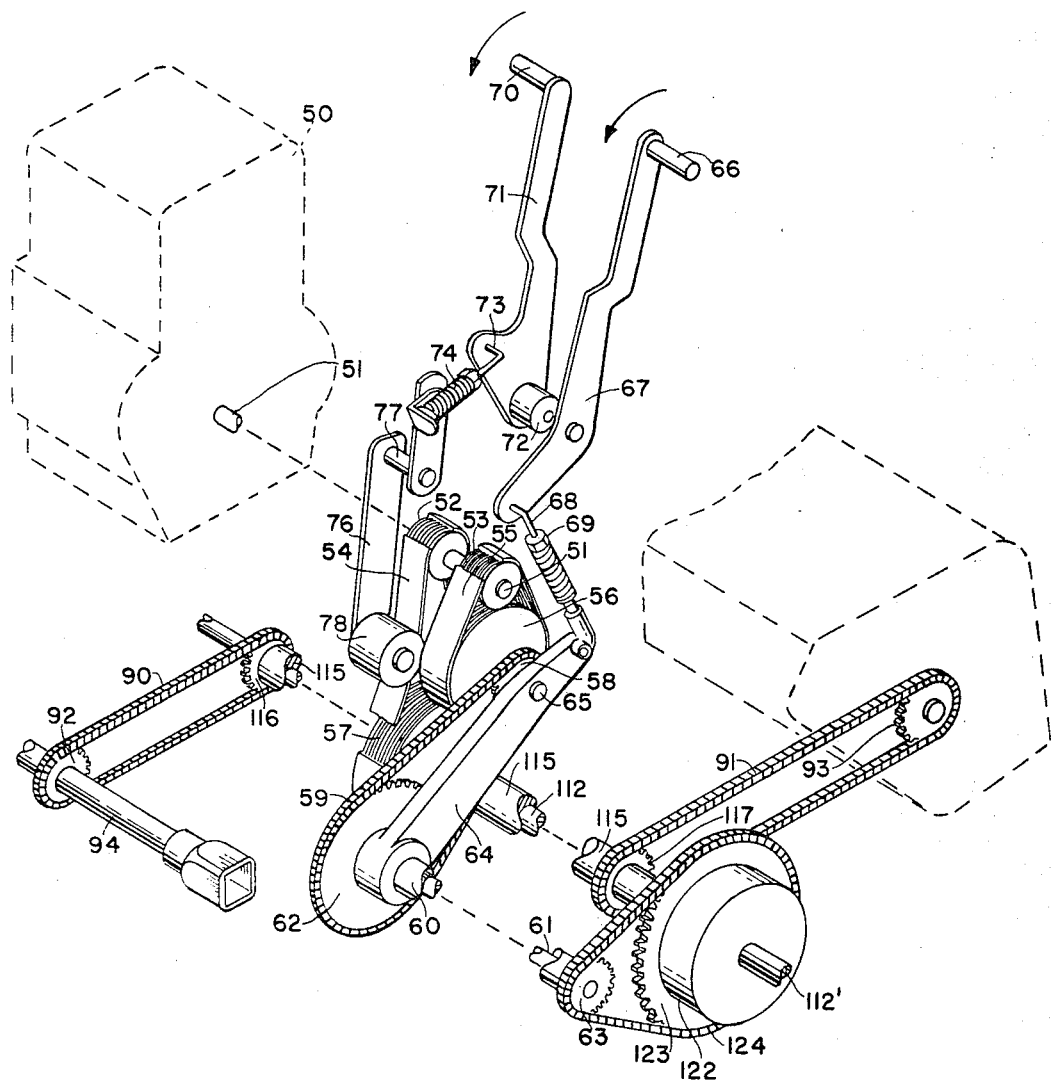
Figure 17:
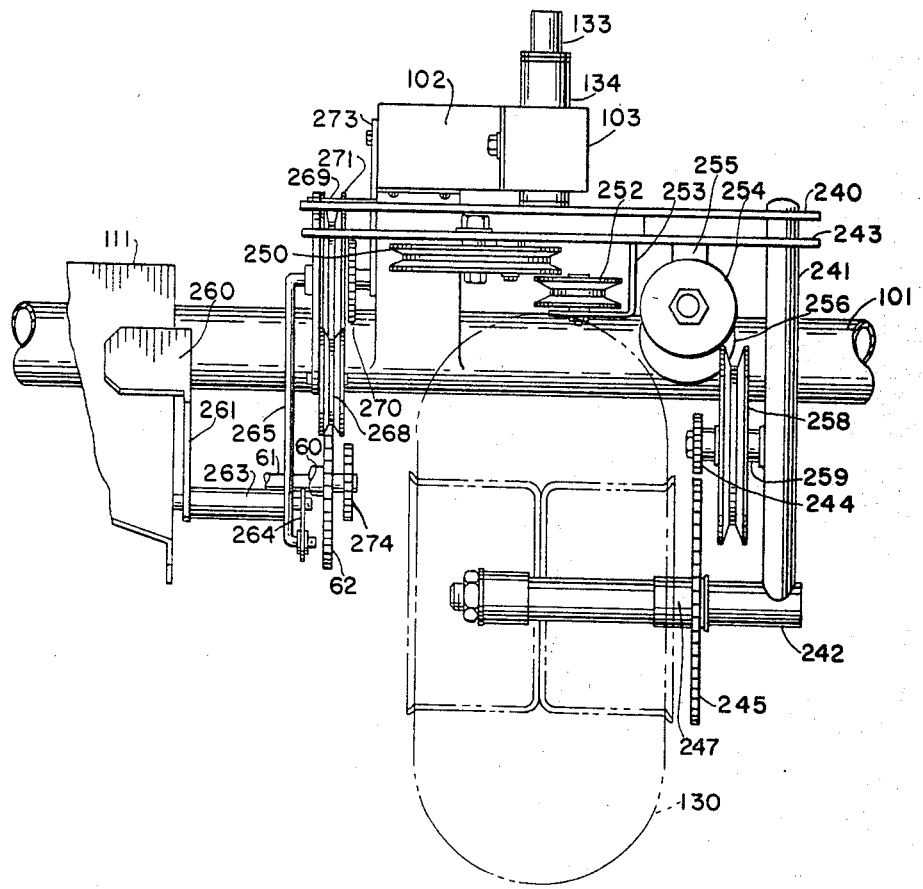
Figure 18:
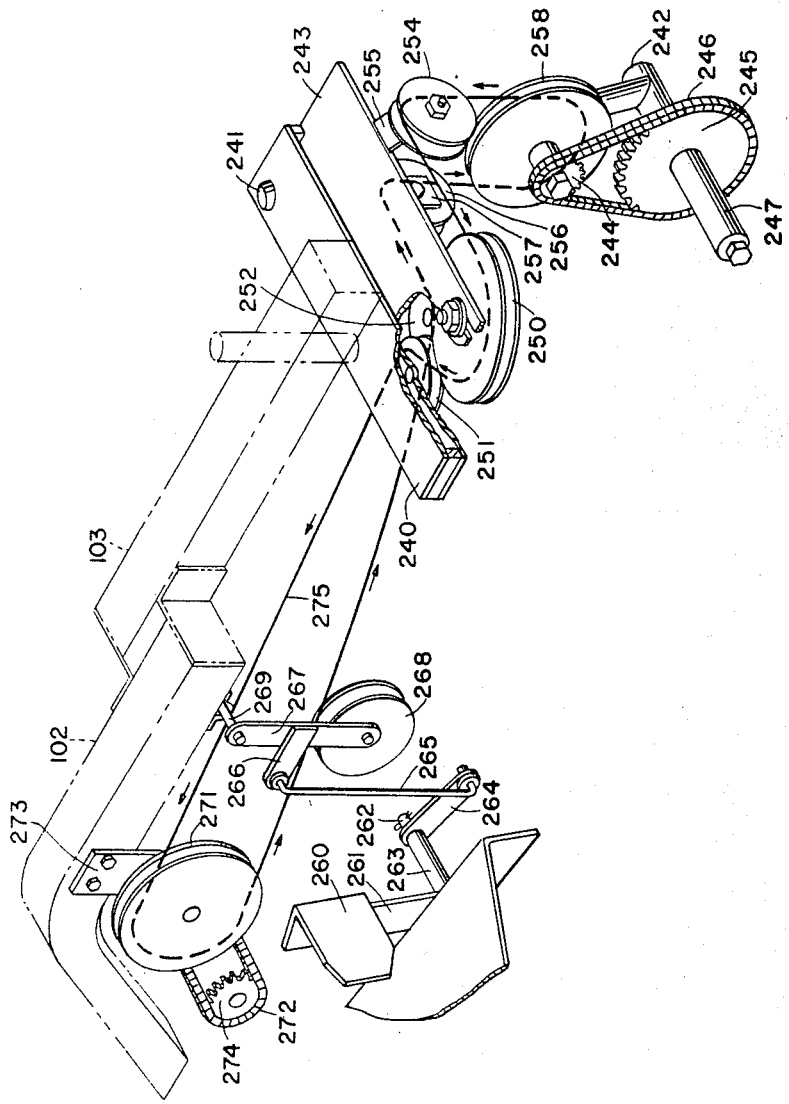

This and other objects of the invention will become apparent from a careful analysis of the specification and drawings, in which:

FIGURE 1 is a perspective view of my overall machine, viewed from the left front corner, FIGURE 2 is a perspective view of the internal frame structure of my mower, as viewed from the left rear corner, FIGURE 3 is a top plan view of the basic supporting frame of my mower, FIGURE 4 is a perspective exploded view showing the relationship of the components at the end of one of my reel-mower assemblies, FIGURE 5 is a cross-sectional side view of one of my reel mower units viewed adjacent to the height of cut adjusting apparatus, FIGURE 6 is a bottom view of a portion of one of my reel mower units, FIGURE 7 is a perspective view of my combined bed-knife and bed-bar arrangement, together with the full length skid and height of cut adjusting device, all of which form a part of each complete reel mower unit, FIGURE 8 is a cross-sectional view of my reel adjusting assembly, FIGURE 9 is a front ground level schematic view of the front mowers, showing the relatively independent vertical movement that may be achieved, FIGURE 10 is a front ground level schematic view similar to FIGURE 9, FIGURE 11 is a ground level view of the basic machine frame with the front mowers in a transport position, FIGURE 12 is a side elevation of the front hitch mechanism shown in somewhat schematic form, FIGURE 13 is a side elevation of the rear hitch shown in somewhat schematic form, FIGURE 14 is an enlarged perspective view of the basic components in my transmission as viewed in FIGURE 1, FIGURE 15 is an exploded perspective view of my "square-ball" universal joint, FIGURE 16 is a cross-sectional view of the universal joint shown in FIGURE 15, FIGURE 17 is a rear elevation of my machine, showing a mechanism for driving the rear wheel, FIGURE 18 is a perspective view of the mechanism shown in FIGURE 17, as viewed from the left rear corner of the machine, FIGURE 19 is a perspective view similar to FIGURE 18, but illustrating an alternate means for distributing power to the rear wheel, and FIGURE 20 is a perspective view of an attachment device used for extending the total width of cut of my machine, viewed from the left rear corner thereof.

*The frame*

The basic frame of my mower is best seen in FIGURES 1, 2, and 3, and, particularly, in FIGURES 2 and 3. A generally T-shaped main frame includes tubular cross member 101 and the base of the T consists of channel members 102 and 103 secured together by bolts or other suitable means as shown. The forward most portion of member 102 is downwardly curved as is best illustrated in FIGURE 1 and welded at its forward end to cross member 101. The rearward end of member 103 is supported by wheel 130 and an interconnecting linkage that will be described in detail below, and the operator's seat 140 is mounted there above. Seat 140 may be rigidly attached to member 103, or as is preferred, may be fastened by means of a support bracket 141 that permits slight forward or rearward adjustment to compensate for the length of the operator's legs. The forward end of member 103 is provided with a suitable bushing or bearing (not shown) to receive upstanding shaft 151 of the steering assembly. The steering wheel or handle such 150 is mounted at the upper end of shaft 151, and a pulley 152 is provided at the lower end of the shaft to facilitate steering by means of cable 153. Further details of this steering linkage will be described below.

The forward portion of the vehicle is supported on wheels 120 and 121, and axle-shaft assembly 112. The basic support for axle-shaft assembly 112 is provided by tubular cross member 101 through engine support members 104 and 107, and foot support members 110 and 111, all of which are securely welded to cross member 101. Engine support member 104 is provided with an upstanding front end portion 106, which surrounds cross member 101 and is securely welded thereto, and it is also provided with a horizontal portion 105, with holes through each end thereof, to serve as a support pad for the engine base. Similarly, engine support member 107 is provided with an upstanding member 109 secured to cross member 101 and with a horizontal portion 108 which cooperates with horizontal portion 105 of engine support member 104 to serve as the total support platform for the engine.

Foot support members 110 and 111 include a sloping upper surface which serves as a foot rest, and downwardly depending sides which are securely welded to cross member 101 at their forward ends. Axle-shaft assembly 112 is supported by members 110, 104, 107, and 111 as is most clearly seen in FIGURE 2. Thus, it is clear that the axle-shaft assembly 112 and the wheels at either end thereof combine with wheel 130 to provide a steerable three-point support platform for the overall mower assembly.

Three reel-mower assemblies 200, 201, and 202, which are substantially similar to one another, are provided. Reel-mower assembly 200 is positioned ahead of wheel 120, reel-mower assembly 201 is positioned ahead of wheel 121, and reel 202 is positioned ahead of wheel 130. Thus, during operation, grass is always mowed ahead of each wheel of the vehicle and this is effective to minimize the "tracking" that occurs with a typical reel mower wherein one or more wheels precedes the cutting reel. Furthermore, it will be noted that reel assemblies 200, 201, and 202 are not independently supported by means of wheels at either end, as is common in modern reel mowers, and my mower structure is therefore effective to eliminate the "tracking" that is inherent in the use of such independently wheeled reel-mowers.

This frame also lends itself to use as an engine muffler (not shown). With exhaust gases piped into the rearward end of member 102, a passageway between members 101 and 102, and a series of small downwardly opening holes at the right end of member 101, effective muffling is achieved.

Steering

The steering of my machine is accomplished by means of steering wheel 150, which is shaped to permit convenient handling of the vehicle by an operator sitting in seat 140. The steering wheel 150 rigidly attached to steering shaft 151, and the lower portion of shaft 151 is rotatably mounted in base channel member 103. A small cable pulley 152 is rigidly attached at the bottom end of shaft 151 immediately beneath the frame member 103. The rear wheel assembly is also attached to base channel member 103, and includes a rear wheel 130 which is mounted on axle 131, the axle being attached to frame member 103 by means of a conventional fork 132. An integral shaft 133 at the upper end of fork 132 is rotatably mounted in frame member 103, with the result that the rear wheel may be freely rotated with respect to the frame of the vehicle, about a vertical axis through shaft 133. The actual steering of this wheel is accomplished by means of cable pulley 135 which is rigidly attached to fork 132 about shaft 133, immediately beneath channel 103, and cable 153 is extended between pulleys 152 and 135. It will be noted that cable 153 has been twisted so as to produce a steering that is comparable to that of a front wheel steered vehicle. For example, if the operator turns steering wheel 150 so as to cause shaft 151 to turn counterclockwise as viewed from the top, thereby calling for a left turn, wheel 130 rotates clockwise on shaft 133 as viewed from the top, in order to produce the left turn as desired.

The operator's seat and its fore and aft adjustment will be most readily understood from FIGURE 1. Operator seat 140, shaped as shown, is provided with a support bracket 141 which is welded to the underside of seat 140. Bracket 141 is U-shaped, and the sides of the U fit down over opposite sides of base channel 103. A bolt 142 or other suitable clamping means is provided to securely clamp the sides of bracket 141 against the sides of channel member 103. By loosening bolt 142, seat 140 may be moved fore and aft along channel member 103, thereby permitting the operator to select a seat position most comfortable for him.

The reel-mowers

The details of each reel-mower assembly will be best understood by reference to FIGURES 4 through 8, inclusive. The reels are constructed to include matching end plates 203 at either end. The end plates are held in spaced parallel relation by intermediate frame members 204 which are securely attached between end plates 203 either by welding directly as shown, or by means of suitable mounting brackets, and by my combined bed-knife and bed-bar 205 which is provided with integral mounting brackets 206 welded at either end. Suitable fastening devices such as screws or bolts are used to fasten members 203 and 206.

End plate 203 is provided with an opening 207, and a bearing plate 208 is pivotally mounted to end plate 203 adjacent said opening by bolt 209, which is sized so as to be somewhat smaller in diameter than the corresponding hole in bearing plate 208. A bearing 219 is carried by said bearing plate 208 as shown, and rotatably supports reel shaft 220. The reel shaft 220 and a portion of bearing 219 extend partially through the opening 207. This assembly is, of course, duplicated at each end of the overall reel-mower assembly.

The overall reel consists of said shaft 220, a plurality of spirally-shaped blades 221, and a plurality of spiders 222, as shown, all of which are welded into an integral assembly and supported in the overall reel-mower assembly by bearing plates 208 as described. Reel-shaft 220 is power driven as will be described more fully below, and by proper adjustment of reel adjustment assembly 210, the blades 221 rotate in close shearing fit with upstanding edge 211 of member 205.

The operation of the reel adjustment assembly will be best understood from FIGURES 4 and 8, wherein the assembly is shown in perspective and cross-sectional views, respectively. It is the basic function of this assembly to raise and lower the reel blades 221 with respect to upstanding edge 211 of my combined bed-knife and bed-bar 205. This is accomplished by rotating bearing plate 208 about bolt 209. As bearing plate 208 is rotated slightly about bolt 209, reel shaft 220 is correspondingly raised and lowered to permit the necessary adjustments.

The rotational movement of bearing plate 208 about bolt 209 is accomplished by adjustment of reel adjust assembly 210. End plate 203 at each end of the reel assembly provides the basic supporting element for reel adjust assembly 210, the support being provided through bracket 225 which is formed as an integral part of end plate 203 as shown, and which is provided with a hole to receive the main adjusting bolt 229, having a hex-head 226 at the upper end. The lower end of bolt 229 threads into lug 230 as shown, and capscrew 232 is positioned through slot 231 in end plate 202 and threaded into lug 230 at right angles to bolt 229. It should be noted that capscrew 232 is also positioned through the rearward end of bearing plate 208 and through arcuate slot 231 in end plate 203, and threads into lug 230. Thus, it is apparent that vertical movement of lug 230 and capscrew 232 along slot 231 thereby causes a corresponding rotary movement of bearing plate 208 about bolt 209; and that a close shearing fit between blades 221 and bed-knife 211 can be achieved by appropriately rotating bolt 229 at each end of the overall reel-mower assembly.

When the mower is in operation, a stone, twig, small piece of metal, or other obstructing object is infrequently struck by one of the blades 221 and is pinched between the blade 221 and bed-knife 211. When that occurs, my reel adjustment assembly 210 is effective to permit the blade 221 and bed-knife 211 to be forced apart and thereby avoid a stalled condition, bending of the blade, or some other damage to the mechanism. This obstruction release mechanism includes threaded sleeve 227, lug 228, and coil spring 233. Threaded sleeve 227 is provided with a hex-head nut at the upper end, and is externally threaded along its length so as to thread into mating internal threads in lug 228. Sleeve 227 is provided with a center bore slightly larger than the outer diameter of bolt 229, to permit relative vertical movement between bolt 229 and sleeve 227. It should also be noted that in the assembled position, lug 228 is relatively close to end plate 203, and it is therefore prevented from rotating with respect to the end plate as the spring tension is adjusted.

This adjustment is made by using a wrench on the hex-head portion of threaded sleeve 227 to thereby cause downward vertical movement of lug 228 along sleeve 227. As lug 228 moves downwardly, spring 233 is compressed between lugs 228 and 230, and it is this spring force that holds reel blades 221 in close shearing fit with bed-knife 211. When an obstruction occurs, an upward force is exerted on the reel assembly to cause a corresponding upward force on bearing plate 208 and lug 230. When this upward force on lug 230 is greater than the downward force exerted by spring 231, lug 230 then forces bolt 226 upwardly through sleeve 227, further compressing spring 233, and causes hex-head 226 to move away from bracket 225. Thereafter, when the obstruction clears itself or is cleared by the operator in the event that a stall occurs, spring 233 restores the reel blades into close sheering fit with bed-knife 211.

My one-piece combined bed-knife and bed-bar 205, together with the skid 212 which extends approximately the full width of each complete mower unit, are most clearly illustrated in FIGURES 5, 6, and 7. Member 205 is formed from a single flat sheet of low carbon steel by bending the sheet along several parallel lines, into the shape as shown, with an upstanding leading edge 211 which serves as a bed-knife, and an elongate, triangular box-like section at the rear. This box is welded closed along its length at the line of contact between the substantially horizontal bottom portion and the sloping upper portion of the member, thereby providing substantially increased shear torsional and bending strength as compared with the flat sheet from which it is formed. End plates 206, which are provided with holes to permit the fastening of this bed-knife and bed-bar assembly between the mower end plates 203, are then welded at either end of member 205. This method of forming the bed-bar produces an assembly that is substantially lighter in weight, and considerably less costly than the conventional bed-bars used in reel type mowers.

The upstanding front edge 211 of this member serves as the bed-knife, but it is much too soft for this purpose when initially formed, and a hardened edge must be provided. This hardened edge is accomplished by bonding a thin bead of extremely hard material such as tungsten-carbide along the front corner of the upstanding edge 211. Either a mechanical or metallurgical bonding process may be used, but the metallurgical bond has been found to produce a superior cutting edge.

Each of the reels is supported on the ground by means of a skid 212 which extends approximately the full width of the mower and is shaped in a generally arcuate configuration as is most clearly seen in FIGURE 5. Each reel is provided with a height of cut adjustment assembly including a bracket 215 welded to intermediate frame member 204 at the approximate center thereof, and bracket 215 is provided with a series of holes 216, as shown. A lug 213 is welded to skid 212 in vertical relation with respect to bracket 215, and an adjusting rod 214 is pivotally mounted to lug 213 as shown. The height of cut is adjusted as is most clearly seen in FIGURE 5 by moving the upper end of rod 214 vertically with respect to bracket 215, and inserting the upper end of rod 214 through the desired hole 216 and securing it with a cotter pin.

It should also be noted that the upper portion of rod 214 is preferably threaded into the pivotal base portion thereof, and it is therefore apparent that five micrometer type height of cut adjustments may be made by rotating the rod in the base and thereby adjust the length of rod 214. As the height of cut adjustment is made, skid 212 pivots with respect to member 205 about pins 217 which are securely welded at either end of skid 212, and which are rotatably secured to bed-bar 205 by means of tabs 218 which are fastened to member 205 by means of capscrews as shown. The leading edge of skid 212 is spaced slightly away from bed-bar 205 except at its extremities where pins 217 are in contact therewith. As a result, any ground shock on skid 212, resulting in deflection thereof is not transmitted directly to the relatively flexible central portion of bed-bar 205, but rather to the extremities thereof and thence directly ino the reel-mower frame. This configuraion is also advantageous in that it places the line of ground contact of the mower only very slightly to the rear of the cutting edge, especially at low heights of cut, as compared to a standard roller-type suspension, resulting in a more uniform cut over irregular gorund. This feature is readily discernible in FIGURE 5.

As will become apparent below, the hitch that is designed to attach the reel assemblies to the overall vehicle is effective to maintain the top edge of end plate members 203 in a substantially horizontal position for any height of cut and it is, therefore, apparent that adjustment of the height of cut mechanism of each reel will cause bed-knife 211 to be moved vertically with respect to the ground, thereby effectively changing the height of cut. Thus, it is apparent that I have shown an effective height of cut mechanism on a reel assembly that is simple and inexpensive to manufacture, and that none of the structure comes in contact with the grass until after it has been cut. It should, also, be noted that the ends 212a of skid 212 are cut back at a rather sharp angle which is effective in the overall geometry of the vehicle to prevent the ends of the skids from plowing into the ground on turns. Thus, they are cut off diagonally inwardly at a rather sharp angle, as shown, along a line corresponding to the tangent of the arc described by the end of the mower during maximum turning of the vehicle.

The reel-mower units that have been hereinabove described are light in weight, inexpensive to manufacture, and convenient to maintain. There are no wheels or rollers as are used in conventional reel units, and the height of cut and reel adjustments are simple but effective. It should be pointed out here that there is considerable interchangeability of parts, although the reel shaft differences are rather significant. It will be noted in FIGURE 1 and other views that shaft 220 of unit 200 extends through its left hand end plate 203 to the left, whereas the extension is to the right in unit 201. The shaft of unit 202 also extends to the left, but this unit differs from unit 200 in that the reel shaft 220 ends in a sprocket to permit a chain drive, whereas unit 200 is driven by a form of universal joint as shown in FIGURES 15 and 16. It should also be noted that I have found it desirable to use sheet metal covers 223 over the top of each unit, which are fastened between intermediate frame members 204 by any suitable means; and that the assemblies 200 and 201 are preferably provided with bumper guards 224 shaped and positioned as shown in FIGURE 1.

*The hitches*

The several reel-mower units described above, are attached to the basic wheeled frame of the vehicle by means of specially designed hitches that are effective to permit relatively independent vertical movement of each mower unit so as to provide relatively uniform mowing over irregular turf. The hitches are also effective to maintain the bed-knife of each mower unit in the same attitude with respect to the ground, regardless of such vertical movement, to thereby assure a uniform height of cut over such irregular turf. These hitches will be best understood by reference to FIGURES 1, 2, 3, and 9 through 13.

The front hitch consists of four basic components, including yoke 160 which is pivotally attached at either end to reel-mower units 200 and 201, respectively; push rod 161 which is connected between the frame and the lower right corner of yoke 160; push rod 162 which is connected between the vehicle frame and the lower left corner of yoke 160; and push rod assembly 163 which is connected between the vehicle frame and the upper center portion of yoke 160.

Reel mower units 200 and 201 are attached together by means of a strap 164 and U-shaped yoke 160. Brackets 165 and 167 are attached to the left end plate 203 of mower unit 200 by means of bolts, welding, or any other suitable means; and brackets 166 and 168 are correspondingly attached to the right end plate 203 of mower unit 201. Strap 164 is pivotally attached at its ends to brackets 165 and 166; and yoke 160 which is provided with short integrally welded straps 169 and 170 at either end is pivotally attached to brackets 167 and 168, as is best seen in FIGURE 3.

This method of attachment permits substantially independent vertical movement of the two mower units 200 and 201 with respect to one another, while at the same time maintaining them in substantial lengthwise alignment as viewed from the top. In FIGURES 9, 10, and 11, FIGURE 9 is a schematic ground level view showing the relative vertical movement that occurs in the event that the inboard end of mower unit 201 encounters a hump in the mowing area, and FIGURE 10 is a similar view showing the relative movement that occurs as the vehicle is moved along a ridge. FIGURE 11 actually shows the mowers in the transport position, and although the mower units are completely removed from the ground in this configuration, it clearly demonstrates the fact that the front hitch is capable of permitting the mower units to assume a position that would permit mowing in a fairly narrow valley. Thus, substantial flexibility is achieved in a straight forward and simple manner.

Push rod assemblies 161, 162, and 163 are pivotally attached at either end so as to permit the relative vertical movement as described above. Rod 162, for example, is bent and threaded at each end as shown, and nuts are used to fasten it to bracket 172 at its forward end, and to bracket 174 at its rearward end. Similarly, rod 161 is fastened at its forward end to bracket 171, and at its rearward end to bracket 173. Brackets 171 and 172 are shaped as is most clearly shown in FIGURE 12, and welded to yoke 160. Bracket 173 is welded to angle iron support member 175, which is in turn welded to engine support member 104; and bracket 174 is welded to angle iron support member 176, which is in turn welded to engine support member 107. Push rod assembly 163 is cast to provide a cylindrical hub at its rearward end, and an upstanding threaded, pin at its forward end. A pin (not shown) is rigidly attached between engine support members 104 and 107, and the cylindrical hub portion of member 163 is rotatably positioned thereon, thus permitting pivotal movement of member 163 about the horizontal axis of said pins. The forward end of assembly 163 is fastened to bracket 159, by means of a nut, bracket 159 being welded to strap 164 and to yoke 160. In some cases, I have found it desirable to provide means whereby rods 161, 162, and 163 may be slightly lengthened or shortened, in order to insure a consistent attitude of the reel mower assembly with respect to the ground in its expected range of operation but this feature has not been shown in order to simplify the drawings.

The function of these push rod assemblies with respect to the mower unit is clearly shown in FIGURE 12. For purposes of this schematic, it is assumed that the mower units 200 and 201 are maintained in a position of coaxial alignment and both raised simultaneously. It will be observed in FIGURE 12 that as this movement occurs, and providing the length of rods 161, 162 and 163 is properly adjusted, the upper edge of the mower end plate 203, which is shown in dotted lines, remains substantially horizontal.

A further feature of my machine, and one which is effective to place approximately 70 percent of the weight of the reel mower units and hitch assemblies on the wheels of the vehicle, is the simple, inexpensive and effective mechanism that is used to suspend the mower units from the basic wheeled frame. This suspension arrangement, with respect to the front mowers, is best seen in FIGURES 1 and 11, and consists of cantilever arms 80 and 81, chains 82 and 83, and compression spring 84. Cantilever arm 80 is pivotally attached to frame number 101 by means of a pin 85 or other suitable means, and compression spring 84 is connected to the lower extremity of arm 80 by means of bolt 86. Similarly, arm 81 is pivotally attached to frame number 101 by means of pin 87, and the lower extremity of arm 81, is connected to the other end of compression spring 84 by means of bolt 88. Since spring 84 is located below pivot points 85 and 87, the longitudinal forces exerted by spring 84 are effective to force the lower extremities of the two cantilever arms 80 and 81 apart, thereby raising the outer ends of arms 80 and 81. This lifting action is thence carried to the reel mower assemblies 200 and 201, by means of chains 82 and 83, respectively, and by proper selection of the size of spring 84, I have found it possible to effectively transfer approximately 70 percent of the weight of the two reel units and hitch assembly onto the wheels of the vehicle, thereby minimizing the weight of the reels on the turf. This tends to prevent turf damage by the full length skid under the mower units, and also has the benefit of providing greater traction for the overall vehicle. It is, of course, essential to equalize the weight carried by chains 82 and 83, and to attach the chains on the intermediate frame number 204 of the reel mower assemblies so as to maintain equal weight on either side of each chain, while maintaining a uniform pressure on the turf across the entire length of each reel-mower skid. This requires that a greater amount of weight be lifted at the inner end of each reel-mower than at the outer ends thereof, principally because of the weight of the connecting hitch and chain drive. In this connection, I have found it desirable to provide means (not shown) for adjusting spring 84 so as to regulate the total force exerted thereby. However, when these chains are properly positioned both with respect to arms 80 and 81, and with respect to the mower units 200 and 201, so as to equalize the affect of the weights and also so as to minimize the affect of the torque that is exerted as the reels of these mowers are power driven, and when spring 84 is properly adjusted, I find that a very uniform ground pressure is achieved across the width of each mower, resulting in a uniform and even cut during operation of the machine.

It should also be mentioned that cantilever arms 80 and 81 are useful in moving the front mower units to a transport position as is shown in FIGURE 11. By lifting on the outer extremity of arm 80, the entire mower unit 200 is raised as is shown in FIGURE 11, and hook 90 which is attached to arm 80, then slides inwardly along slot 91 in bracket 89, which is welded to tubular frame member 101. Eventually, hook 90 falls into the lower end of the arcuate portion of the slot 91 as shown in FIGURE 11. Similarly, the outer end of arm 81 is lifted upwardly, thereby raising mower 201, and hook 92 is effective to cooperate with slot 93 to hold this assembly in the upward position. The connecting hitch assembly is, of course, raised with the mower units, and is thereby elevated to a position intermediate the inner ends of the mower units as shown in FIGURE 11. Each mower is conveniently released merely by directing its hook into the horizontal portion of the respective slot while lifting slightly on the end of the cantilever arms, and then lowering the arm to permit the mower to move downwardly to the ground.

Another feature that is significant is torsion rod 182. This is a spring steel rod, shaped so as to eliminate any interference with reel drive chain 90, and is rigidly attached at its extremities near the forward ends of push rods 161 and 162, respectively. This torsion rod is effective when the inner end of either mower is raised, for example, as is shown in FIGURE 9, to force the inner end of mower unit 201 back to the horizontal position after it passes over the hump. This occurs because of the fixed length of rods 161 and 162, and the fixed spacing between them, whereby a twisting motion is imparted to the torsion bar when the inner end of either reel mower is moved upwardly as is shown in FIGURE 9. The continuing tendency of this rod to restore itself to its untwisted condition is effective to create a small force for maintaining the forward mower units in horizontal alignment.

The hitch for the rearward mower unit 202 is substantially similar to the hitch for the forward mowers, and is most clearly seen in FIGURES 2 and 13. Pull rods 185 and 186 are pivotally connected between the vehicle frame and opposite sides of reel mower unit 202. Brackets 183 and 184, which are welded to the end plates, support the rearward end of each rod; and the forward ends are supported by bearing bracket 114 and the vertical side wall of foot support member 110, as shown. A third connection between the vehicle frame and reel mower unit 202 is accomplished by means of elements 187, 188, 189, and 190. Bracket 190 is bolted to the front intermediate frame member 204 of reel mower unit 202, and adjustable rod 187 is pivotally attached thereto. The forward end of rod 187 is bolted to the upper portion of bracket 188, and the bottom portion of bracket 188 is formed as an integral part of fork-shaped bracket 189 which is, in turn, pivotally attached to the engine support members 104 and 107 by means of bolts and bushings, or other suitable means. The effect of this hitch assembly as reel mower unit 202 moves vertically, is shown schematically in FIGURE 13, and it is seen that the top edge of mower end plate 203 remains substantially horizontal throughout the range of vertical movement that is normally to be anticipated during mowing. Thus, the attitude of the bed-knife with respect to the ground remains constant, thereby assuring a uniform height of cut even though the terrain may be uneven. It would, of course, be possible to provide length adjusting means in each of the three frame-to-mower links for reel mower assembly 202, and thereby permit the operator to make critical on-location adjustment during use of my machine.

As is the case with the front mowers as described above, the trailing reel mower unit 202 is provided with means for shifting a substantial portion of the total weight of the mower unit to the frame of the vehicle. This is accomplished by means of a spring and piston assembly including elements 191 through 195, inclusive. Adjusting bolt 191 is threaded at its outer end, and a spring retainer 193 is brazed to the bolt in the position shown. This bolt threads through adjusting lug 192 which fits snugly into the narrow end of fork-shaped bracket 189 and is thereby prevented from rotating as bolt 191 is turned. The forward end of bolt 191 is slideably positioned in sleeve 195, which is in turn pivotally attached to the vehicle frame by means of pin 197. A spring retainer 196 is rigidly attached to the sleeve 195. Compression spring 194 is positioned between the two spring retainers as shown, and tends to force telescoping bolt 191 out of sleeve 195, and thereby rotate bracket 189 about its point of connection at the vehicle frame. Thus, it is the tendency of spring 194 to impart an upward force through elements 187, 188, and 190, to reel mower unit 202. The actual force that is exerted is adjustable by means of the hexhead at the end of bolt 191, and is most effective when adjusted to cause approximately two-thirds of the weight of reel mower unit 202 to be lifted from the ground and onto the vehicle frame.

It will be noted in FIGURE 3 that the upward force exerted through rod 187 occurs at point slightly removed from the center of reel mower assembly 202, thereby providing a torque which tends to lift the left end of mower unit 202 to a greater extent than the right end. This configuration has been found to be necessary because of the additional weight at the left end due to the chain and sprocket, and to compensate for the forces that are created by the torque that is applied to the shaft of this reel in order to power drive the same. This power driving arrangement will be discussed below.

The transmission

The transmission of automotive power from engine 50 to wheels 120 and 121, and to the driven reel shafts of reel mower units 200, 201, and 202, will be best understood from FIGURES 1, 2, 3, and 14. While shaft 112 is described in a general way above as being in support of the wheels of the vehicle, the actual details of this support are significant in connection with the transmission of energy to the wheels. Actually, the shaft 112 does not extend the full width of the wheels, since the main shaft 112 ends at differential 122 (FIGURE 3), and stub-shaft 112' extends from the other side of the differential into supporting engagement with wheel 121. Axle 112 is actually supported between sleeve 113 and bearing 118. Sleeve 113 is slightly larger than shaft 112, and is rigidly welded to the vertical side flanges of footrest 110 and the downward extending portions of engine support members 104 and 107. This sleeve actually ends just to the left of motor support member 107 (see FIGURE 3), and a bushing is provided at each end of sleeve 113 so as to provide support for shaft 112 at those two points. A grease fitting (not shown) may be provided in sleeve 113 to permit proper lubrication of the cylindrical area between shaft 112 and sleeve 113.

Bearing 118 provides support for the other end of the shaft, and is rigidly mounted to bearing bracket 114, which is in turn welded to the downwardly extending left hand portion of footrest 111. Shaft 112 supports a sleeve 115 as shown, sleeve 115 being sized to fit loosely between the left end of sleeve 113 and bearing 118, and bushings are provided at each end of sleeve 115 to permit rotation of sleeve 115 with respect to shaft 112. A sprocket 116 is rigidly attached at the right end of sleeve 115, and a sprocket 117 is rigidly attached to sleeve 115 near the left end thereof. These sprockets are effective to transmit rotary driving force to the reel shafts as will be described hereinafter. A grease fitting (not shown) may be provided in sleeve 115 to permit proper lubrication between sleeve 115 and shaft 112. Pulley 57 is also rigidly attached to sleeve 115, and is effective to transmit the energy from engine 50 to sleeve 115.

The left end of shaft 112 is keyed to the hub of differential 122, and stub-shaft 112' is rigidly attached at the center of wheel 121, and is keyed to the opposite hub of differential 122. A sprocket 123 forms an integral part of differential 122, and is effective when driven by a chain to cause simultaneous rotation of shafts 112 and 112'. However, as the vehicle is turned, differential 122 permits shafts 112 and 112' to turn at different rates of speed, in the usual manner.

An intermediate jack-shaft 61 is also provided, and is rotatably mounted in sleeve 60, which is rigidly welded across the downwardly extending sides of footrest 111 as is most clearly seen in FIGURE 2. Bushings (not shown) are provided at either end of sleeve 60, and a grease fitting (not shown) may be provided as in the case of sleeves 113 and 115 to permit lubrication. Traction drive arm 64 is provided with a hub at its forward end, said hub being rotatably mounted on shaft 61 adjacent the right end of supporting sleeve 60, and is therefore rotatable on shaft 61 and independent of shaft rotation. Sprockets 62 63 are keyed on either end of shaft 61, and are effective to provide two stages of speed reduction to the driven wheels.

The overall transmission of energy is most clearly seen in FIGURE 14, which is drawn in schematic and exploded form, and generally from the same perspective as is seen in FIGURE 1. However, the scale is considerably larger in FIGURE 14.

Engine 50 is mounted on engine support members 104 and 107 as have been previously described, and is provided with a horizontal output shaft 51. Pulleys 52 and 53 are keyed to shaft 51, and are continuously rotating when the engine is running.

Pulley 52 supplies the energy for driving the reels, and this energy is carried by belt 54 to pulley 57, which in turn drives rotatable sleeve 115 on shaft 112. Sprockets 116 and 117 on sleeve 115 are thereby driven, and this energy is carried by chains 90 and 91, respectively, to sprockets 92, and 93, respectively. When the reels are disengaged, there is ordinarily enough slack in belt 54 to permit slippage of the belt with respect to pulley 52, and thereby prevent the transmission of energy to the reels. However, when handle 70 is moved to engage position in the direction of the arrow shown, link 71 pivots on pin 72 which is supported by member 102 of the main frame. Spring link 74 then causes idler pulley arm 76 to be rotated in a counterclockwise direction as viewed in FIGURE 14, about pin 77, said pin 77 being securely mounted across the vehicle frame 102. Idler pulley 78 is thereby moved into engagement with belt 54, causing the rotation of pulley 57 and the transmission of rotary energy to the blades of the mowers. It should be noted that this linkage is provided with an over-center capability, in that movement of handle 70 to the full engaged position causes point 73 on link 71 to move below a straight line drawn between the axis of pin 72 and the forward end of spring link 74. The spring on link 74, which is slightly compressed as link 74 moves to the indicated line, is thereafter effective to hold arm 71 in such over-center position, and thereby hold the reels in operation, until a force is exerted on handle 70 to restore the linkage to its disengaged position.

The rearward end of arm 64 carries rigid stub shaft 65, pulley 56 and sprocket 58 being rotatably mounted thereon and fastened together so as to rotate at the same angular speed. Pulley 53 is effective to drive pulley 56 through belt 55, and thereby drive sprocket 62 through sprocket 58 and chain 59. This energy is then carried by shaft 61 to sprocket 63 which drives sprocket 123 through chain 124.

In order to achieve forward motion of the vehicle, handle 66 is moved in the direction as shown by the arrow in FIGURE 14 thereby causing arm 67 to rotate in a counterclockwise direction about pin 72. Spring link 69 is then effective to force the rearward end of arm 64 and pulley 56 downwardly about pivotal axis 61, thereby causing belt 55 to be tightened against pulleys 53 and 56, and driving energy is then transmitted to the wheels in the manner described above. It should be noted that an over-center capability is also inherent in this linkage, since movement of handle 66 to the full forward position causes points 68 on spring link 69 to drop behind a line between the axis of pin 72 and at the rear of arm 64 to which link 69 is pivotally connected. Here again, a spring on link 69 is slightly compressed as link 64 moves to the indicated line, and is thereafter effective to hold arm 67 in this full forward position, making it unnecessary for the operator to hold handle 66 as he is normally mowing. It should also be noted that a three step speed reduction is accomplished by means of my transmission arrangement, one step from pulley 53 to pulley 56, and the second and third steps going to sprockets 62 and 123, respectively.

My novel arrangement of pulleys and sprockets also makes it very simple to reverse the vehicle, merely by pulling back on handle 66, which is normally provided with springs (not shown) to hold it in the neutral position. However, when handle 66 is pulled back against the force of the neutral spring, link 69 is moved upwardly thereby moving the rearward end of arm 64 and 56 upwardly moving pulley 56 into direct engagement with pulley 53 and causing pulley 56 to be rotated in the reverse direction. When this occurs, the wheels of the vehicle are obviously driven in the reverse direction. In this configuration, it should be noted that since shaft 65 and its supporting arm 64 move rotatably about shaft 61, the movement of pulley 56 to either the forward or reverse position does not effect a change in the center distance between sprockets 62 and 58, causing chain 59 to remain equally tight in either position.

It will be obvious that sprocket 93 is connected directly to the reel shaft of reel mower unit 202, and the energy transmitted by chain 91 is thereby effective to directly drive the reel of this mower. However, the drive for the front reels is somewhat different, and it will be noted that sprocket 92 is keyed to an intermediate shaft 94. Shaft 94 is effective to drive the shafts of both reel mower assemblies 200 and 201 through unique and simple universal coupling as is most clearly seen in FIGURES 15 and 16. A socket 95 is welded at either end of intermediate shaft 94. A specially shaped cubic flange 98, which has a regular square shape as viewed from the end, but having its four sides rounded so as to appear round when viewed from one side as in FIGURE 16, is rigidly attached at the inner end of each reel shaft 120 of reel mower units 200 and 201. These square-ball flanges fit into sockets 95 at either end of shaft 94, and are effective to transmit rotary energy to the cutting reels. This geometry of this square-ball connection at either end of intermediate shaft 94 permits the reel shaft of mower units 200 and 201 to be continuously driven, even though there is considerable relative vertical movement of reel mower units 200 and 201 as is partially illustrated in FIGURES 9 and 10. In this respect, it should be noted that the horizontal pivotal axis of each square-ball, e.g. the square-ball at the left end of mower unit 200, lies in direct alignment with the horizontal axis on which the corresponding mower-unit pivots with respect to its side hitch, e.g. the axis through brackets 165 and 167.

I have found that by constructing square-ball 98 out of nylon, and by properly sizing this element with respect to socket 95, a trouble-free universal joint operation is achieved in a simple and inexpensive manner, with a substantial minimizing of maintenance expenses. In FIGURE 16, these elements are shown in cross-section, and the wide range of vertical flexibility is shown. Also in FIGURE 16, I have shown two washers 96 on either side of a compressible rubber washer 97, these washers being effective to permit shaft 94 to fit snugly between the square-ball at either end thereof.

*Powered rear wheel*

In some situations, and especially when my machine is to be driven up a relatively steep grade, I have found it desirable to drive all three wheels of the vehicle, rather than just the front two, and configurations are shown in FIGURES 17, 18 and 19 for accomplishing this purpose. In FIGURE 17, which is a rear elevation of my machine, I have shown one configuration for driving the rear wheel, in combination with several of the basic frame elements of the overall machine. Tubular cross member 101, and base channel member 102 and 103 are shown, as is the left footrest 111, together with the rear wheel fork-shaft 133 as has been previously described. In this configuration, I have shown shaft 133 mounted in a bearing sleeve 134, and while the cable pulley for vehicle steering has not been shown, it should be understood that steering would ordinarily be provided as is shown in FIGURE 1.

The support for rear wheel 130 is accomplished by means of a cantilever bracket including support plate 240 which is welded to shaft 133, intermediate support 241 which is welded to plate 240, and axle 242 which is welded at the bottom end of intermediate support 241. Axle 242 supports wheel 130 as shown. A pulley support plate 243 is also provided, and welded in spaced relationship to support plate 240. This additional support plate—although used for the purpose of supporting five pulleys in the wheel driving configuration—also contributes rigidity to the overall cantilever support for the wheel 130. The several pulleys mounted to pulley support plate 243 include pulleys 250 and 251 which are rotatably mounted directly to the plate 243 by suitable bolts, pulley 252 which is rotatably mounted to bracket 253 which is in turn welded to pulley support plate 243, pulley 254 which is rotatably mounted to bracket 255 which is in turn welded to pulley support plate 243, and pulley 256 which is rotatably mounted to support bracket 257 which is in turn welded to pulley support plate 243. The significance and relative positions of these pulleys will be best understood by reference to FIGURE 16, which shows the several pulleys in perspective relationship.

Energy for driving the rear wheel in this configuration is obtained from jack-shaft 61 as will now be described. Sleeve 60 supports jack-shaft 61 in the manner described above, and driven sprocket 62 supplies the energy for turning shaft 61. By slightly lengthening jack-shaft 61, and adding additional small sprocket 274 to the right of sprocket 62, an energy source for the rear wheel drive is obtained that is effectively driven in either the forward or reverse direction, along with the front wheels, as above described. Drive sprocket 274 drives sprocket 270 by means of chain 272, sprocket 270 being rotatably mounted on shaft 273 which is in turn rigidly mounted to the frame of the vehicle. Pulley 271 is directly attached to sprocket 270, and is therefore rotated at the same angular speed as sprocket 270. A long cable or round belt 275 is positioned in the groove of pulley 271, and wound through the various pulleys adjacent wheel 130 as is best seen in FIGURE 16. Arrows on this belt 275 indicate the direction of movement of the belt through the pulley system adjacent to the wheel. Thus, it is apparent that starting from the bottom of pulley 271, belt 275 proceeds past idler pulley 268 thence around pulleys 252, 256, 258, 254, 250, 251, and then back to the upper portion of pulley 271. Pulley 258, which rotates on shaft 259, is keyed to sprocket 244, and the counterclockwise movement of pulley 258 as seen in FIGURE 18 is therefore effective to cause the counterclockwise rotation of sprocket 244, which in turn drives sprocket 245 in a counterclockwise direction by means of chain 246. Sprocket 245 is keyed to sleeve 247, which also supports wheel 130 on shaft 242, and it is therefore apparent that the indicated direction of movement of belt 275 would be effective to cause forward movement of the vehicle.

The relative speeds of the various elements in this system are significant, and it will be noted that sprockets 274 and 270 are the same size, whereas pulley 271 is substantially larger in diameter than sprocket 270. Thus, the speed of belt 275 is actually increased over that of chain 272, since I have found it desirable to have belt 275 move as rapidly as possible in order to maximize the transmission of power. However, pulley 258 is slightly larger than pulley 271, and the speed of rotation of sprocket 244 is therefore slower than that of pulley 271. An additional larger speed reduction occurs between sprocket 244 and 245, because of the relative difference in size. The effect of these two reductions from pulley 271 to sprocket 245 produces a rear wheel speed that is equal to the speed of the front wheels during normal operation.

It should also be noted in FIGURES 17 and 18 that belt 275 enters pulley 251 and leaves pulley 252 at a tangent point that is in direct alignment with the axis of shaft 133. Thus, as the rear wheel is turned, as a result of steering the vehicle, the tension of belt 275 remains the same. For example, if we assume that shaft 133 is turned clockwise as viewed from the top, belt 275 wraps further around pulley 251, but simultaneously unwraps by an equivalent amount from pulley 252, and although pulley 251 moves slightly forward with respect to shaft 133, pulley 252 moves rearwardly by an equal amount. Furthermore, it should be noted that with the pulleys positioned as indicated, the torque created by the energy in belt 275 is centered on the axis of shaft 133, and these forces are therefore ineffective to cause any turning moment that can be felt by the operator of the vehicle in the steering wheel.

I have found it unnecessary to energize wheel 130 continuously during operation, and have therefore used a separate foot operated control for causing energy to be transmitted to the rear wheel only when needed. This arrangement is most clearly seen in FIGURE 18 and includes a foot pedal 260 attached to lever arm 261. Lever arm 261 is rigidly attached to sleeve 263, which is in turn mounted for rotation on bolt 262. Bolt 262 is rigidly attached to one side of footrest 111. A lever arm 264 is rigidly attached to the right end of sleeve 263, and the rearward end of arm 264 is therefore caused to move arcuately upward as foot pedal 260 is depressed by the operator. Rod 265 is bent over at each end and inserted through an oversized hole in the rearward end of rod 264, so as to be rotatable with respect thereto, and is held in place by a cotter pin. Similarly, the upper end of rod 265 is inserted through an oversized hole and lever arm 266, and secured in place by a cotter pin, being thereby relatively rotatable with respect to arm 266. Lever arm 266 is welded to elongate arm 267, and a pulley 268 is rotatably mounted at the lower end of arm 267. The upper end of arm 267 is rotatably mounted at the left end of pin 269, which is in turn rigidly mounted to frame 102 by means of a strap and screws as shown. Thus, as pedal 260 is depressed by the operator, pulley 268 is swung arcuately upwardly into engagement with belt 275, thereby tightening belt 275 against the pulleys in its path and causing the rotational force on pulley 271 to be carried to the rear wheel. With idler pulley 268 in its normal position, belt 275 is sufficiently loose so that slippage occurs at pulley 271, and wheel 130 is freely rotatable as the vehicle is moved across the ground under the influence of the traction driven front wheels.

While I have shown and described a belt drive arrangement for the rear wheel, it is obvious that numerous other configurations could be used for transmitting energy from the jack-shaft to the rear wheels. One such alternate is shown in outline form in FIGURE 19, and includes a gear box 280 which is shown attached to the right end of jack-shaft 61, and the output of gear box 280 is effective to transmit energy to gear box 285 through universal joints 281 and 284, and telescoping shaft 282-283. The output of gear box 285 is then effective to drive pulley 244, which in turn drives sprocket 245 by means of chain 246 as described in connection with FIGURE 16. A telescoping feature for shaft 282-283 is necessary because of the slight changes in length that occur as rear wheel 130 is steered by the operator. However, this factor is somewhat minimized by locating universal joint 284 in direct vertical alignment with the axis of shaft 133.

Thus, it is apparent that there are alternate ways to drive the rear wheel, and I contemplate the use of one or more such driving arrangements for the rear wheel of my vehicle.

*Five unit extension*

My machine readily lends itself to increase in the overall width of cut, and I have found it desirable in some situations to increase the width of cut for a standard three unit machine from 84 inches to 138 inches. This is accomplished by adding an additional mower unit at either end of the single trailing mower unit 202, by use of the extender unit and frame shown in FIGURE 20. In FIGURE 20, I have shown two additional reel mower units 300 and 301 which are identical to reel mower units 201 and 200, respectively. These additional mower units may be very conveniently added to the unit, and thereby increase the overall width of cut, through use of the frame structure shown in FIGURE 20. This frame is supported from the main frame of the vehicle by means of mounting plates 302 and 303 which are intended to be bolted to base channel member 103 at a point slightly to the rear of reel mower 202. Rods 304 and 305 are rigidly welded to plates 302 and 303 respectively, and the other ends of these rods are bolted to main support member 306 as shown. Cantilever arms 310 and 313 are rotatably mounted at opposite ends of member 306, and the outer ends of these arms are tensioned upwardly by means of tension spring 316. A bracket 311 is welded to arm 310, and bracket 312 provides a connection from bracket 311 to one end of spring 316; whereas bracket 314 is welded to arm 313, and bracket 315 provides a connection between arm 314 on the other end of spring 316. One end of spring 316, such as 317, may be provided with means (not shown) for adjusting the tension of spring 316, to thereby adjust the lifting forces exerted by cantilever arms 310 and 313. Chains 318 and 319 are connected between the cantilever arms and the mower units, and function in the same manner as chains 82 and 83, previously described.

It is, of course, necessary to prevent these mowers from moving away from each other along a longitudinal axis, and straps 320 through 323 are supplied for this purpose. Straps 320 and 321 are mounted between reel mower units 300 and 202, and straps 322 and 323 are mounted between mower units 202 and 301. Suitable brackets such as 165 and 166, previously described, attach to each mower to support straps 320 through 323. Brackets 324 and 325 prevent independent rotation of the mower units with respect to one another about their longitudinal axis.

The method of driving these mowers is identical to that shown for mower units 200 and 201, since square-ball drive shaft assemblies 326 and 327 are used, each being identical to the corresponding square-ball drive shaft shown in FIGURES 15 and 16. It will be understood that if the machine is to be readily convertible between 3 and 5 mowing units, reel mower unit 202 would be furnished with its shaft 220 slightly extended at each end and terminated in a square-ball as previously described with respect to mower units 200 and 201. Then, with square-ball drive shafts 326 and 327 in their proper positions, energy transmitted to sprocket 93 by means of chain 91 would be effective to cause simultaneous rotation of all three reels, and a continuous driving force would be thereby imparted to all three mowers even though the mowers articulate vertically with respect to one another as the overall machine is moved over uneven terrain. At the same time, a substantial amount of the additional weight introduced by these two additional mowing units 300 and 301 is transmitted to the frame of the vehicle by means of the lifting force of spring 316, thereby minimizing the direct weight on the ground across the full length skids of the mower units. It will be further understood that a similar pair of mowers and suitable attaching means could be provided to extend the front row of mowers, and thereby further extend the machine from the 5 reel configuration to a 7 reel configuration.

While there has been described what is at present considered to be the preferred embodiment of this invention, it will be obvious to those skilled in-the-art that various changes and modifications may be made therein without departing from the invention and it is, therefore, aimed in the appended claims to cover all such modifications as fall within the true spirit and scope of the invention.

What is claimed is:
1. A grass cutting device comprising:
a wheeled automotive frame,
a ground following elongate mowing apparatus attached to said frame in a transverse position, the weight thereof being approximately equally divided on either side of the longitudinal centerline of said frame,
a pair of cantilever arms pivotally attached to said frame so as to extend transversely outwardly in opposite directions therefrom, in close proximity to said mowing apparatus,
link means attached to the outer ends of said arms and to said mowing apparatus such that the weight of said mowing apparatus is approximately equally disposed on either lengthwise side of each point of attachment on said mowing apparatus, and
common spring means for and attached to both of said cantilever arms so as to continuously urge the outer ends of said arms upwardly and thereby transfer a substantial portion of the weight of said mowing apparatus onto said frame.

2. A grass cutting device comprising:
a ground supported motive frame,
a pair of mowing units carried by said frame,
a pair of cantilever arms pivotally attached to said frame, and attached to said mowing units to support the weight thereof,
and spring means interconnecting said cantilever arms and common to both and urging the portions thereof connected with said mowing units upwardly thereby transferring a substantial portion of the weight of said units to said frame.

3. A grass cutting device comprising:
a ground supported motive frame,
a pair of normally horizontally aligned mower units,
bracket means connecting said mowers in endwise relation so as to permit pivotal movement of each mower with respect to said bracket means about horizontal axes paralleling the direction of travel,
first link means connecting one end portion of said bracket means to said frame,
second link means connecting the other end portion of said bracket means to said frame,
said link means being pivotally connected with said frame for movement relative thereto and to each other about a horizontal axis transverse to the normal direction of travel of said frame permitting independent vertical movement of their respective units relative to said frame,
and torsion spring means common to and interconnecting said first and second link means,
said spring means yieldingly resisting tilting movement of said units about horizontal axes paralleling the direction of travel and urging them towards normal horizontal alignment.

4. A grass cutting device comprising:
a ground supported motive frame,
a pair of transversely aligned mower units,
bracket means disposed between said units and pivotally connected to the inner ends thereof for relative vertical movement therebetween about horizontal axes paralleling the direction of travel,
said bracket means constraining said mower units in a common vertical plane,
and means connecting said bracket means with said frame for oscillating translatory movement of said bracket means relative to said frame about a horizontal axis transverse to the direction of travel.

5. A grass cutting device comprising:
a ground supported motive frame,
and a mower assembly connected with said frame and propelled thereby said mower assembly including a pair of laterally spaced apart mowers transversely aligned with respect to the normal direction of travel and interconnected by bracket means to which they are pivotally attached for swinging movement relative to each other, said frame and said bracket means about separate horizontal axes paralleling said direction of travel,
the entire mower assembly being capable of free vertical movement relative to said frame,
each transverse end of said mowers being capable of vertical movement relative to said frame without simultaneous vertical movement of the opposite end thereof.

6. A grass cutting device comprising:
a ground traversing frame,
a pair of laterally spaced apart mowing units transversely aligned with respect to the normal direction of travel of said frame,
mower connecting means comprising first, second and third link means, said first link means extending between and pivotally connected to the forward inner end portions of said mowing units for independent pivotal movement of said units relative to said link means and each other about separate horizontal axes paralleling said direction of travel, said second link means extending between and pivotally connected to the rearward inner end portions of said units for independent pivotal movement of said units relative to each other and said second link means about separate horizontal axes paralleling said direction of travel, said third link means interconnecting said first and second link means, fourth and fifth link means extending in said direction of travel and pivotally connecting opposite end portions of said second link means with said frame, one end of said fourth and fifth link means being pivotally connected to said second link means, the other end of said fourth and fifth link means being pivotally connected to said frame, the pivotal movement of both ends of said fourth and fifth links being about horizontal axes transverse to said direction of travel.

7. The device of claim 6, including a sixth link extending in said direction of travel and having one end thereof connected with said mower connecting means and the other end thereof pivotally connected with said frame for pivotal movement about a horizontal axis transverse to said direction of travel.

8. A grass cutting device comprising:
a ground traversing frame,
a pair of laterally spaced apart mowing units transversely aligned with respect to the normal direction of travel of said frame,
first link means extending transversely of said direction of travel and interconnecting said mowing units and maintaining them in said transverse alignment,
said mowing units being pivotally connected to opposite end portions of said link means for independent pivotal movement of said units relative to each other and said link means about horizontal axes paralleling said direction of travel,
second link means extending in said direction of travel and having one end pivotally connected to said first link means and the other end pivotally connected to said frame, the pivotal movement of both ends of said second link means being about horizontal axes transverse to said direction of travel,
said mowing units and the entire first link means being simultaneously vertically swingable relative to said frame about the aforementioned pivot connection between said second link means and said frame.

9. A grass cutting device comprising:
a ground traversing frame,
a pair of laterally spaced apart mowing units transversely aligned with respect to the normal direction of travel of said frame,
first link means interconnecting said mowing units and maintaining them in said transverse alignment,
each of said mowing units being pivotally supported by said link means for independent pivotal movement relative to the other unit and said link means about a horizontal axis paralleling said direction of travel,
second link means pivotally connected to said first link means and to said frame, the pivotal movement of said second link means relative to said first link means and said frame being about horizontal axes transverse to said direction of travel,
said mowing units and the entire first link means being simultaneously swingable relative to said frame about the aforementioned pivot connection between said second link means and said frame.

10. A grass cutting device comprising:
a ground traversing frame,
a pair of laterally spaced apart mowers substantially transversely aligned with respect to the normal direction of travel of said frame,
first link means extending between and interconnecting said mowers,
each of said mowers being pivotally connected to said first link means for independent swinging movement relative thereto and to the other mower about a horizontal axis paralleling said direction of travel, and
second link means connecting said first link means with said frame for vertical movement of said first link means in its entirety relative to said frame, said second link means being free to pivot relative to said frame about a first horizontal axis transverse to said direction of travel and free to pivot relative to said first link means about a second horizontal axis parallel to and spaced from said first axis.

11. The device of claim 10, wherein said second link means enables said first link means to swing vertically relative to said frame about a horizontal axis transverse to said direction of travel.

12. The device of claim 10, wherein said link means maintain said mowers in said transverse alignment and maintain the angle of attack of said mowers constant throughout the normal range of movement of said mowers relative to said frame.

13. A riding mower comprising:
a wheeled tractor,
a plurality of reel mowers of the type having a plurality of spirally disposed knives mounted on a rotatable shaft, constructed to provide only a sliding contact with the ground,
control means interconnecting said tractor and said mowers so as to permit said mowers to follow the contours of the ground independent of said tractor,
said control means including a plurality of link means individually connected between said tractor and each of said mowers, and
resilient means attached to said link means so as to impart an upward force to a portion thereof and thereby continuously urge said mowers upwardly so as to transfer a substantial portion of the weight thereof onto said tractor,
one of said link means being in the form of a U-shaped fork rotatably mounted at its open end to a horizontal transverse pin attached to said tractor,
said resilient means including a compression spring mounted between the closed end of said form, and a point on said tractor lower than the axis of said pin.

14. A grass cutting device comprising:
a ground traversing frame,
a pair of laterally spaced apart mowers transversely aligned with respect to the normal direction of travel of said frame,
first link means interconnecting said mowers,
each of said mowers being adapted for pivotal movement relative to said link means about horizontal axes paralleling said direction of travel, and
second link means connecting said first link means with said frame for vertical translatory swinging movement of said mowers and the entire first link means relative to said frame about a horizontal axis transverse to said direction of travel,
said link means maintaining the angle of attack of said mowers constant during movement of said mowers relative to said frame.

15. A grass cutting device comprising:
a ground traversing frame,
a pair of laterally spaced apart mowers transversely aligned with respect to the normal direction of travel of said frame,
first link means extending between and pivotally connected to forward and rearward portions of each of said mowers for independent pivotal movement of said mowers relative to said link means and each other about separate horizontal axes paralleling said direction of travel, second and third link means extending in said direction of travel and pivotally connecting opposite end portions of said first link means with said frame, one end of said second and third link means being pivotally connected to said first link means, the other end of said second and third link means being pivotally connected to said frame, the pivotal movement of both ends of said second and third links being about horizontal axes transverse to said direction of travel.

16. The device of claim 15, including:

a fourth link means extending in said direction of travel and having one end thereof connected with said first link means and the other end thereof pivotally connected with said frame for pivotal movement about a horizontal axis transverse to said direction of travel, said second, third and fourth links permitting vertical translatory swinging movement of the entire first link means and said mowers relative to said frame and maintaining the angle of attack of said mowers constant during movement thereof relative to said frame.

17. A grass cutting machine comprising:

a ground traversing frame, a pair of laterally spaced apart mowers transversely aligned with respect to the normal direction of travel of said frame, bracket means interconnecting said mowers in endwise relation so as to permit pivotal movement of each mower with respect to said bracket means about horizontal axes paralleling said direction of travel while constraining said mower in said transverse alignment, and control means interconnecting said frame and said bracket means, said control means being effective to permit vertical movement of said bracket means in its entirety with respect to said frame and simultaneous relative vertical movement between the lateral endwise extremities of said bracket means while at all times maintaining the angle of attack of said mowers substantially constant with respect to the horizontal during normal operation of said machine.

18. The grass cutting machine of claim 17, wherein said control means includes a first link pivotally connected between said frame and the central portion of said bracket means, a second link pivotally connected between said frame and one lateral end portion of said bracket means, and a third link pivotally connected between said frame and the other lateral end portion of said bracket means.

19. The grass cutting machine of claim 18, including a tension member attached to said second and third links and effective when twisted as a result of relative vertical movement between the lateral endwise extremities of said bracket means to urge said endwise extremities of said bracket means into horizontal alignment.

20. The grass cutting machine of claim 17, additionally comprising means attached to said control means so as to continuously urge the lateral endwise extremities of said bracket means into horizontal alignment.

21. The grass cutting machine of claim 17, including a pair of cantilever arms separate from said bracket means pivotally attached to said frame so as to extend transversely outwardly in opposite directions therefrom, link means attached to the outer ends of said arms and to said mowers such that the weight of said mowers is approximately equally disposed on either lateral side of each point of attachment to said mowers, and spring means attached to said cantilever arms so as to continuously urge the outer ends of said arms upwardly and thereby transfer a substantial portion of the weight of said mowers onto said wheels.

References Cited

UNITED STATES PATENTS

| | | | |
|---|---|---|---|
| 1,944,584 | 1/1934 | Stegeman et al. | 56—7 |
| 2,764,864 | 10/1956 | Kinkead | 56—7 |
| 3,058,281 | 10/1962 | Lewis | 56—7 |
| 2,636,332 | 4/1953 | Cole | 56—249 |
| 2,667,026 | 1/1954 | Ingram | 56—249 |
| 2,838,124 | 6/1958 | Cramer | 180—70 |
| 3,003,574 | 10/1961 | Strunk | 180—70 |
| 2,712,739 | 7/1955 | Dempster | 64—7 |
| 2,903,866 | 9/1959 | Nichols | 64—7 |
| 2,671,300 | 3/1954 | Kinkead | 56—249 |
| 2,896,390 | 7/1959 | Cunningham | 56—249 |
| 2,521,059 | 9/1950 | Goldberg | 76—101 |
| 3,089,352 | 5/1963 | Chamouard | 76—101 |
| 2,879,859 | 3/1959 | Swicher | 180—26 |
| 3,110,352 | 11/1963 | McClarnon | 180—26 |
| 1,725,375 | 8/1929 | Seeley | 56—7 |
| 1,886,408 | 11/1932 | Locke et al. | 56—26 |
| 2,168,706 | 8/1939 | George et al. | 56—7 |
| 2,299,859 | 10/1942 | Speiser | 56—7 |
| 2,490,171 | 12/1949 | Swahnberg | 56—249 X |
| 2,659,190 | 11/1953 | Imbt | 56—7 |
| 2,674,075 | 4/1954 | Snow | 56—11 |
| 3,177,638 | 4/1965 | Johnson | 56—7 |

FOREIGN PATENTS

| | | |
|---|---|---|
| 773,091 | 4/1957 | Great Britain. |

RUSSELL R. KINSEY, *Primary Examiner.*

UNITED STATES PATENT OFFICE
CERTIFICATE OF CORRECTION

Patent No. 3,410,063

November 12, 1968

Ralph W. Speiser

It is certified that error appears in the above identified patent and that said Letters Patent are hereby corrected as shown below:

Column 20, after line 24 insert:

22. The grass cutting machine of claim 17, wherein said mowers are reel-type mowing units capable of swinging vertical movement relative to said frame about a horizontal axis transverse to said direction of travel,
 a common drive shaft for and extending between said units, substantially coaxial with the reels of said units and swingable simultaneously with said units relative to said frame about said transverse axis,
 universal coupling means drivingly connecting opposite ends of said shaft to said reels,
 a power source carried by said frame,
 and means drivingly connecting said power source with said drive shaft.

23. The grass cutting machine of claim 17, wherein said mowers are capable of vertical translatory movement relative to said frame,
 a common drive shaft for and extending between said mowers and capable of vertical translatory movement relative to said frame,
 coupling means drivingly connecting opposite ends of said shaft to said mowers and permitting movement of said mowers relative to said shaft about horizontal axes paralleling said direction of travel,
 a power source carried by said frame,
 and means drivingly connecting said power source with said drive shaft.

24. The device of claim 23, wherein said mowers and shaft are swingable simultaneously relative to said frame about a horizontal axis transverse to said direction of travel.

25. The grass cutting machine of claim 17, wherein said frame has a source of power mounted thereon,
 said pair of mowers are reel mowers,
 a first drive shaft extending between said pair of mowers substantially coaxial with the reels thereof and drivingly connected thereto by coupling means permitting movement of said mowers relative to said shaft about horizontal axes paralleling said direction of travel,
 a first drive sprocket on said first shaft,
 a third reel mower paralleling and spaced from said pair of mowers longitudinally of said direction of travel and positioned so as to overlap the inner ends thereof, means connecting said third mower with said frame for ground traversing propulsion thereby and enabling said mower to move vertically relative to said frame, a second drive sprocket attached to the reel of said third mower, a second drive shaft driven by said source of power and carrying third and fourth drive sprockets, a first drive chain drivingly interconnecting said first and third sprockets, and a second drive chain drivingly interconnecting said second and fourth sprockets.

In the heading to the printed specification, line 7, "21 Claims." should read -- 25 Claims. --.

Signed and sealed this 17th day of March 1970.

(SEAL)
Attest:

EDWARD M. FLETCHER, JR.
Attesting Officer

WILLIAM E. SCHUYLER, JR
Commissioner of Patents